May 23, 1939. M. O. SNEDIKER 2,159,819
THERMOSTATIC WATER MIXER
Filed March 13, 1937
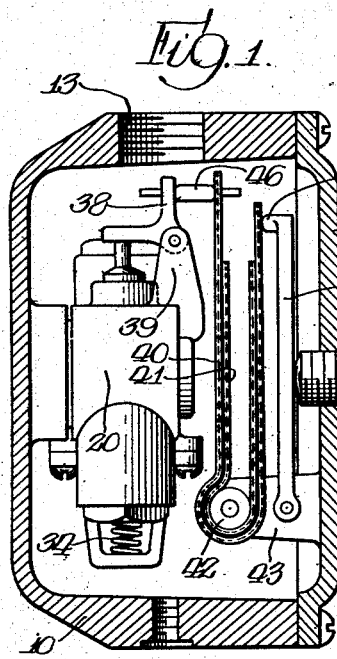
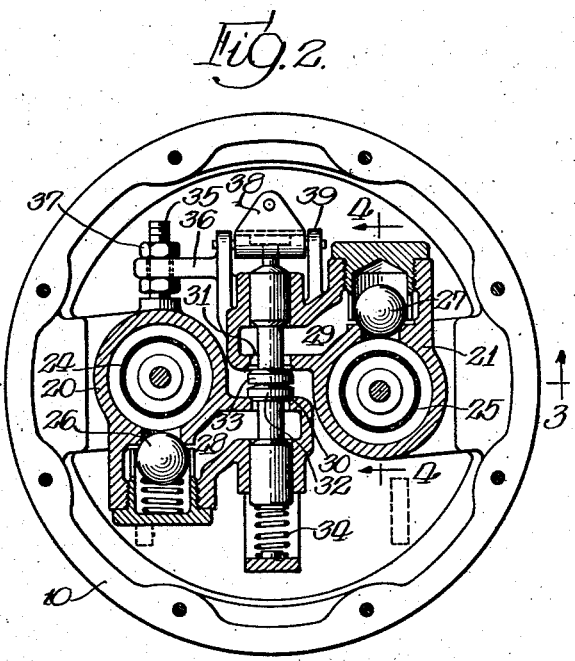
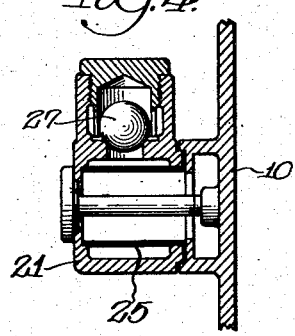
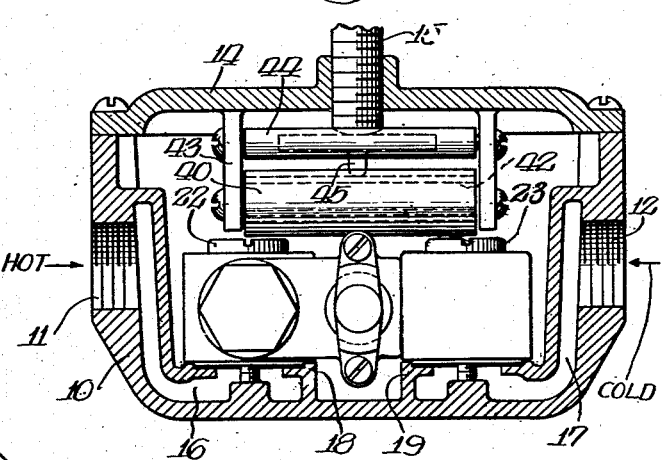
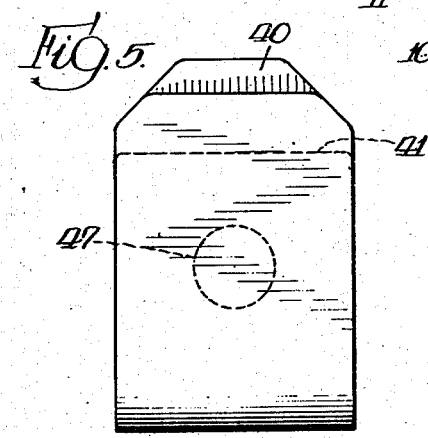
Inventor
Morton O. Snediker
By Murray & Murray Attys.

Patented May 23, 1939

2,159,819

UNITED STATES PATENT OFFICE 2,159,819

THERMOSTATIC WATER MIXER

Morton O. Snediker, Chicago, Ill., assignor to The Powers Regulator Company, Chicago, Ill., a corporation of Illinois Application March 13, 1937, Serial No. 130,748

7 Claims. (Cl. 236—12)

My invention relates to a device for controlling the delivery temperature of intermixed fluids, and particularly to a controller for showers.

An object of my invention is to improve the construction and operation of devices of the class described, and particularly consists in providing a simplified arrangement in which the fluids of different temperatures are admitted at substantially the same point, thus insuring thorough intermixing before the fluids contact the thermostatic element. This is accomplished by providing two aligned oppositely faced valve seats and a pair of balanced valves in end-to-end relation, so disposed that an opening movement of one valve through the action of the thermostat will bring about a corresponding closing movement of the other valve.

Since mixers of the character described are used for different purposes in which the requirement is for the delivery of anywhere from a few gallons a minute to twenty or more gallons per minute, at has been found difficult, in one instrument, to effect accurate control throughout the range. This is accomplished in the construction here disclosed by providing for relative movement of the valve seats, all by the use of very simple mechanism. When it is desired to adjust the device for the delivery of a small volume, an adjustment is made in which the valve seats are brought close together, thus leaving very little capacity for movement of the respective valves; in fact, only so much movement as will permit the maximum desired flow in any position of the valves.

A further improvement resides in the construction and arrangement of the thermostatic element. It is a well-known fact that in bimetal strips as heretofore arranged, force and movement are functions of each other. In a desire for effecting greater movement, the length of the strip has been increased, but this results in a corresponding decrease in force. A common form of bimetal thermostatic element has been that of a coiled strip, the total length of which is several feet and while adequate movement is secured, there is a corresponding loss of force, with a consequent requirement that the valve or other part to be moved by the element, must be very delicate in its adjustments.

I have overcome the objection to the described arrangement by providing a thermostatic strip of adequate length to secure the requisite movement, and for increasing the force I multiply the number of strips and join them for operation in unison. In this manner I am able to secure the force and movement required and by forming the element into a loop I am able to accommodate the element within a casing of the required small size.

The invention will be more readily understood by reference to the accompanying drawing, in which;

Fig. 1 is a sectional view through the casing of a shower mixer, the operating parts being shown in elevation;

Fig. 2 is a view with the face plate removed and the operating parts shown in vertical section;

Fig. 3 is a sectional view on the line 3—3 of Fig. 2 with the operating parts shown in bottom plan;

Fig. 4 is a sectional view on the line 4—4 of Fig. 2; and,

Fig. 5 is an elevation of the thermostatic element.

In the drawing I have shown a casing 10 having a hot water inlet 11, cold water inlet 12 and a mixed fluid outlet 13. In a face plate 14, there is an adjusting screw 15 which may be operated by means of the usual handle, not shown.

The casing provides cored out passages 16—17 for the hot and cold fluids respectively, the passages terminating in hollow bosses 18—19 over which the valve bodies 20—21 are fitted with capacity for rotation and held in place by screws 22—23. It will be noted that valve bodies provide for screens 24—25 and check valves 26—27.

The passages 28—29 formed in the lateral arms of the bodies terminate in valve seats 30—31 controlled by balanced valves 32—33, as shown. The ends of the arms overlap so that the valve seats may be oppositely disposed in aligned relation. The valve heads are in contacting end-to-end relation, the head 32 having a rounded upper surface. A spring 34 tends to move the valve toward a position in which the upper valve is completely closed.

A screw 35 carried by the valve body 20 and an arm 36 carried by the valve body 21 cooperate through nuts 37 to effect limited relative rotary movement of the valve bodies whereby to change the spacing of the respective valve seats. In other words, the turning of the nuts serves to rotate one or both of the bodies on the bosses, accomplishing adjustment of valve travel.

Thermostatic control of the valve is effected through a bell crank 38 pivoted on lugs 39 formed as a part of the valve body 21, one arm of the bell crank contacting the upper end of the stem of the upper balanced valve. A thermostatic element in the form of a pair of joined bimetal strips 40—41 is shaped into a loop and loosely supported by means of a half eye at the closed end of the loop, on a support 42 carried on lugs 43 formed as a part of the cover 14. Preferably, the two or more strips are joined only at points near their ends and are slightly spaced apart at the closed end of the loop. An arm 44 also pivoted to lugs 43 has a projection 45 which bears against the normally fixed end of the loop. A thrust link 46 projects through an opening in the free end of the loop and through the bell crank arm to transfer the thrust of the element to the bell crank.

It will be seen that upon removing the cover the thermostat and its adjusting member are removed with the cover. Also that upon removing the two screws 22—23, the valve bodies may be removed as a unit and the screens may be removed for cleaning.

The operation will be clear without extended description. Hot and cold fluids being deliverd to the passages they will escape past the valves and be co-mingled immediately after passing said valves. The action on the thermostatic element will, therefore, be free from violent fluctuation such as occurs where the mixture is not complete before the thermostat is contacted. In order to insure that both arms of the U-shaped thermostat will be subjected to the mixed fluids, I provide an opening 47 in the arm nearest to the water discharge from the valves.

While the element is formed as a loop, yet the operative effect will be the same as that of a straight or coiled strip, due to the flexible support of the loop on the shaft 42, and the fact of separation of the two elements at the closed end.

It will be understood that the movement necessary to effect a substantial change in the proportion of the hot and cold fluids will be small—in fact, rather minute, and since the valves are balanced and the heat-sensitive element is of considerable width and of laminated construction, the operation will be quick and certain regardless of fluctuations in the entrance pressures of the two fluids. Since the valves—which act as one valve—are moved in only one direction by the thermostat and in the opposite direction by a spring, there will be no lost motion and consequently no "hunting" due to lost motion, and the response to temperature changes will be immediate.

Modifications in the several details of construction may be made within the skill of a mechanic and are contemplated in the attached claims.

I claim:

1. In combination, a casing having two inlets and an outlet, a valve body for each inlet, said valve bodies each having a lateral hollow arm terminating in a valve seat, the arms projecting toward and overlapping each other whereby the said valve seats are substantially axially aligned and oppositely disposed, and means for effecting relative rotation of said valve body whereby to vary the spacing between valve seats, a pair of balanced valves with their stems in alignment and their heads in contacting end-to-end relation and cooperating with said seats.

2. In combination, a casing having two inlets and an outlet, a valve body for each inlet, said valve bodies each having a lateral hollow arm terminating in a valve seat, the arms projecting toward and overlapping each other whereby the said valve seats are substantially axially aligned and oppositely disposed, and a pair of valves with their stems in alignment and their heads in contacting end-to-end relation and cooperating with said seats, and means for effecting relative rotation of said valve body whereby to vary the spacing between valve seats, a thermostat acting on one end of the aligned valve stems.

3. In combination, a casing having two inlets and an outlet, a valve body for each inlet, said valve bodies each having a lateral hollow arm terminating in a valve seat, the arms projecting toward and overlapping each other whereby the said valve seats are substantially axially aligned and oppositely disposed, a pair of balanced valves with their stems in alignment and thier heads in contacting end-to-end relation and cooperating with said seats, and means for effecting relative rotation of said valve body whereby to vary the spacing between valve seats, a thermostat acting on one end of the aligned valve stems.

4. In combination, a casing having two inlets and an outlet, a valve body for each inlet, said valve bodies each having a lateral hollow arm terminating in a valve seat, the arms projecting toward and overlapping each other whereby the said valve seats are substantially axially aligned and oppositely disposed, a pair of valves with their stems in alignment and their heads in contacting end-to-end relation and cooperating with said seats, and a bimetal thermostatic strip mounted in the casing and lying across the mixing space at the outlets from the two valves and connected to the valves.

5. In combination, a casing having two inlets and an outlet, a valve body for each inlet, said valve bodies each having a lateral hollow arm terminating in a valve seat, the arms projecting toward and overlapping each other whereby the said valve seats are substantially axially aligned and oppositely disposed, means for effecting relative movement of the bodies to vary the extent of separation of the seats, a pair of valves with their stems in alignment and their heads in contacting end-to-end relation and cooperating with said seats, and a bimetal thermostatic strip mounted in the casing and lying across the mixing space at the outlets from the two valves and connected to the valves.

6. In combination, a casing having two inlets and an outlet, a valve having a stem and a valve body providing a seat for each inlet, said valve bodies and valves being so arranged that said valves and stems are in end-to-end relation and the valve seats are in substantial axial alignment and separated not substantially more than the thickness of the valve heads, whereby the discharge from both the inlets into the casing is at substantially a single point, and a bimetal thermostatic strip mounted in the casing and lying across the mixing space at the outlets from the two valves and connected to the valves.

7. In combination, a casing having two inlets and an outlet, a valve body for each inlet, said valve bodies each having a lateral hollow arm terminating in a valve seat, the arms projecting toward and overlapping each other whereby the said valve seats are substantially axially aligned and oppositely disposed, a pair of valves with their stems in substantial alignment and their heads in contacting end-to-end relation and cooperating with said seats, a spring for moving said head-to-head valves in one direction and a thermostat for moving the valves in the opposite direction, one valve being opened to the extent that the other is closed, and means for shifting one of said valve bodies whereby to vary the spacing of the valve seats and to vary the discharge from the valves.

MORTON O. SNEDIKER.